(12) United States Patent
Bogdonoff et al.

(10) Patent No.: US 6,298,876 B1
(45) Date of Patent: Oct. 9, 2001

(54) QUICK DISCONNECT COUPLING

(75) Inventors: Alan Charles Bogdonoff, New London; Arthur Paul Kathe, Lyme, both of CT (US)

(73) Assignee: Ozone Industries, Inc., East Lyme, CT (US)

( * ) Notice: Subject to any disclaimer, the term of this patent is extended or adjusted under 35 U.S.C. 154(b) by 0 days.

(21) Appl. No.: 09/847,575

(22) Filed: May 2, 2001

(51) Int. Cl.$^7$ ..................................... F16L 37/36
(52) U.S. Cl. ................. 137/614.06; 137/614.04
(58) Field of Search .............. 137/614.06, 614.05, 137/614.04

(56) References Cited

U.S. PATENT DOCUMENTS

| | | |
|---|---|---|
| 2,333,423 | 11/1943 | Hufferd . |
| 2,439,275 | 4/1948 | Spotz . |
| 3,116,943 | 1/1964 | Wagner . |
| 3,278,205 | 10/1966 | Barlow . |
| 3,527,480 | 9/1970 | Larson . |
| 3,590,862 * | 7/1971 | De Graaf .................. 137/614.06 X |
| 3,606,244 | 9/1971 | Nusbaum . |
| 3,664,375 | 5/1972 | Marette . |
| 3,897,091 | 7/1975 | McMath et al. . |
| 4,030,524 | 6/1977 | McMath et al. . |
| 4,090,524 | 5/1978 | Allread et al. . |
| 4,102,356 | 7/1978 | Knight . |
| 4,135,551 | 1/1979 | Knight et al. . |
| 4,234,161 | 11/1980 | Wilder et al. . |
| 4,271,865 | 6/1981 | Galloway et al. . |
| 4,359,066 | 11/1982 | Hunt . |
| 4,392,513 | 7/1983 | Parrish . |
| 4,515,182 | 5/1985 | LeDevehat . |
| 5,078,170 | 1/1992 | Henry . |
| 5,090,449 * | 2/1992 | Fournier et al. ................. 137/614.05 |
| 5,129,621 | 7/1992 | Maiville et al. . |
| 5,273,071 | 12/1993 | Oberrecht . |
| 5,316,347 | 5/1994 | Arosio . |
| 5,595,217 | 1/1997 | Gillen et al. . |
| 5,615,707 | 4/1997 | Pfannenschmidt . |
| 5,628,344 | 5/1997 | Roberts . |
| 5,671,777 | 9/1997 | Allen et al. . |
| 6,155,294 | 12/2000 | Cornford et al. . |

* cited by examiner

*Primary Examiner*—Kevin Lee
(74) *Attorney, Agent, or Firm*—Alston & Bird LLP

(57) ABSTRACT

A quick disconnect coupling is provided which is designed to minimize or eliminate flow obstruction when the coupling members are connected. Each coupling member includes a swing valve which is movable from a closed, sealed position to an open position which is out of flow-obstructing relation with the flow passageway. An actuator mechanism is provided for moving the swing valves from the closed position to the open position while simultaneously locking the coupling members in tightly sealed relation.

20 Claims, 7 Drawing Sheets

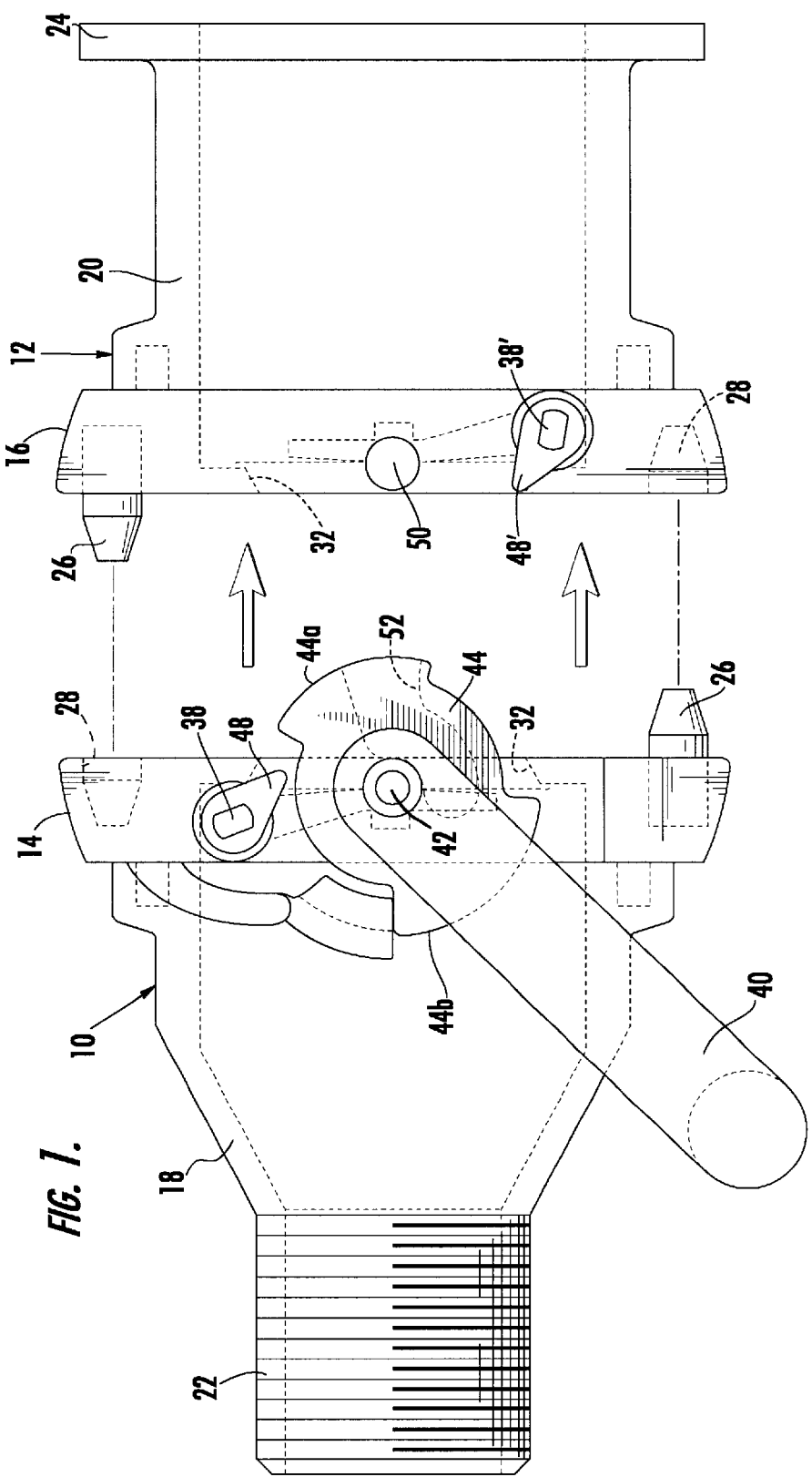

QUICK DISCONNECT COUPLING

FIELD OF THE INVENTION

This invention relates to couplings, and more particularly to a quick disconnect coupling for quickly connecting or disconnecting two components of a fluid line.

BACKGROUND OF THE INVENTION

Various types of quick disconnect couplings have been produced to facilitate connecting and disconnecting components of a fluid conduit, such as a hydraulic line. Examples of quick disconnect couplings of this type are illustrated and described in U.S. Pat. Nos. 2,333,423; 3,897,091; 4,392,513; and 5,129,621. In each of these coupling designs, a valve element is located in each coupling member for quickly closing the flow passageway when the coupling members are disconnected. However, a significant limitation of these valve designs is that the valve element remains in the flow passageway when the coupling members are coupled, thus partially obstructing the flow. This can result in an undesirable increase in pressure drop at the coupling. Also, these designs are not well-suited for systems which convey solids, such as slurries or pneumatically conveyed solids, since the solids can become lodged in the flow restrictions caused by the valve elements.

SUMMARY OF THE INVENTION

The present invention provides a "dry break" quick disconnect coupling which is designed to minimize or eliminate flow obstruction when the coupling members are connected. Each coupling member includes a valve element which is movable from a closed, sealed position to an open position which is out of flow obstructing relation with the flow passageway. An actuator mechanism is provided for moving the valve elements from the closed position to the open position when the coupling members are coupled together.

More particularly, the quick disconnect coupling comprises a pair of cooperating coupling members, each having an axial bore defining a flow passageway. The coupling members are movable between a disconnected state and a coupled state with the flow passageways interconnected in fluid communication. A swing valve is pivotally mounted within each coupling member and is movable between an open position out of flow obstructing relation with the flow passageway and a closed, sealed position blocking the flow passageway. An actuator mechanism cooperates with each of the swing valves for moving the swing valves from the closed position when the coupling members are in the disconnected state to the open position when the coupling members are in the coupled state. The actuator mechanism is movable between a released position and a locked position, and it serves to hold the coupling members in the coupled state when the actuator mechanism is moved to the locked position. In a preferred embodiment, the actuator mechanism includes a handle which is movable between the released and locked positions, a cam connected to and movable by the handle, and a cam follower associated with each swing valve. The cam follower cooperates with the cam for moving the swing valve from the closed position to the open position. The handle and the cam are mounted to one of the coupling members and a locking member is carried by the other one of the coupling members. A locking surface formed on the cam cooperates with the locking member for locking the pair of coupling members together when the handle is moved to the locked position.

BRIEF DESCRIPTION OF THE DRAWINGS

FIG. 1 is a side elevational view showing a pair of coupling members in the uncoupled or disconnected state;

DETAILED DESCRIPTION

Figure 3:
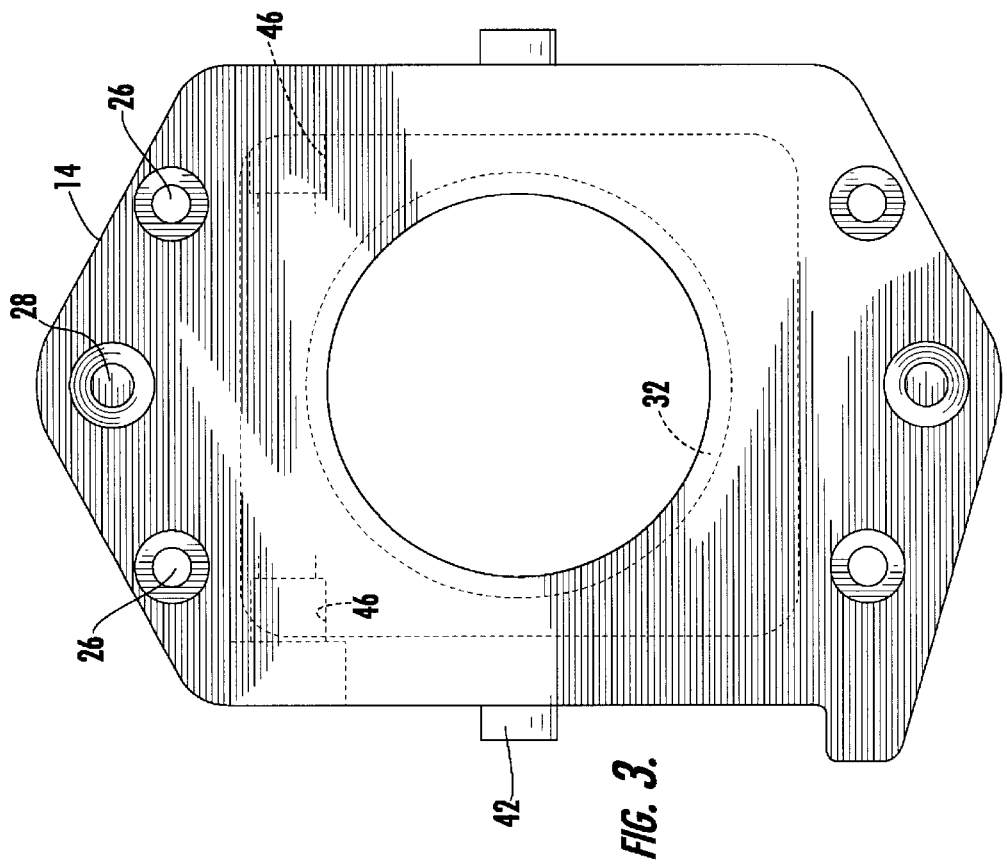
FIG. 3 is a front elevational view of the coupling plate of FIG. 2.
Figure 2:
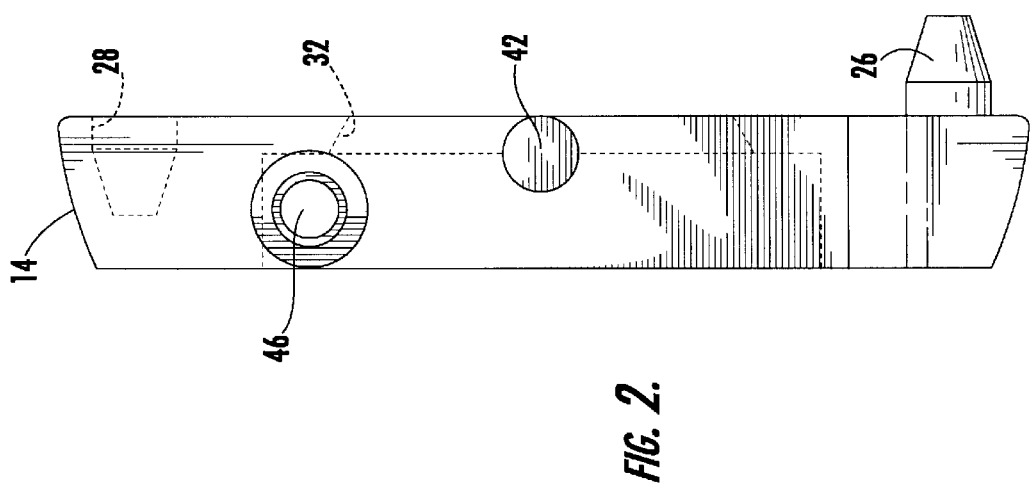
FIG. 2 is a side elevational view showing the coupling plate which forms part of the left coupling member shown in FIG. 1.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As shown in FIG. 1, the quick disconnect coupling includes first and second coupling members 10, 12 which are adapted to be coupled together to connect two components of a fluid flow system. The coupling members 10, 12 have a hollow interior defining an axial flow passageway. In the embodiment shown, the coupling members include respective coupling plates 14, 16 defining substantially planar sealing surfaces which lie in a plane substantially perpendicular to the axial flow passageway. The sealing surfaces are adapted to be positioned in face-to-face engagement to form a fluid-tight seal. Respective hollow shell-like coupling housings 18, 20 are connected to and extend from the back side of each coupling plate.

In the embodiment shown, the coupling housing 18 of coupling member 10 is provided with an externally threaded fitting 22 for connecting with a fluid conduit and the coupling housing 20 of the cooperating coupling member 12 is provided with a flanged fitting for connecting to another component of the fluid flow system. It should be understood, however, that it is within the scope of the present invention to employ various types of fittings for connection with conduits or other fluid flow components.

Figure 8:
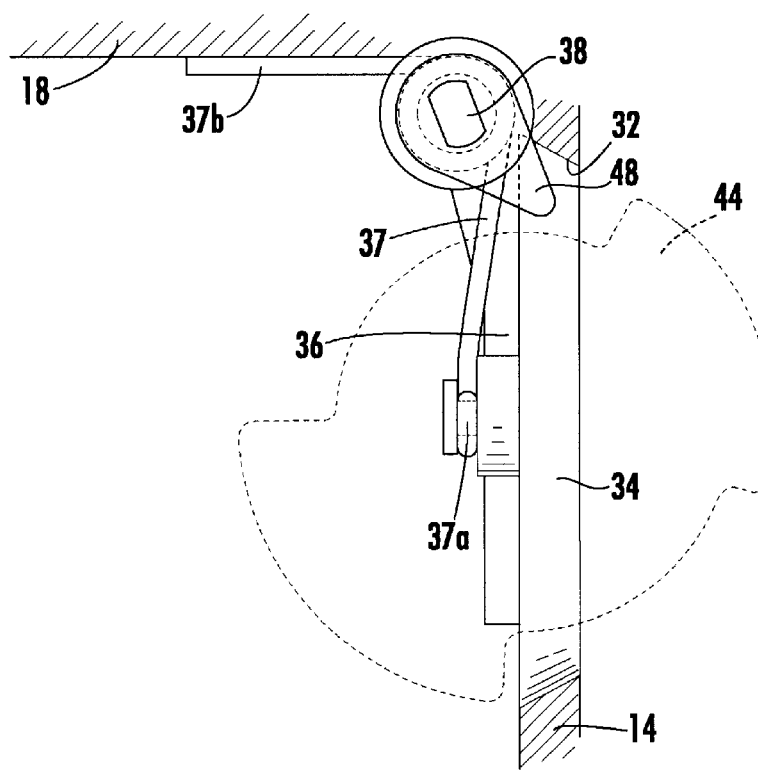
FIG. 8 is a detailed view showing the swing valve in the closed position.
Figure 9:
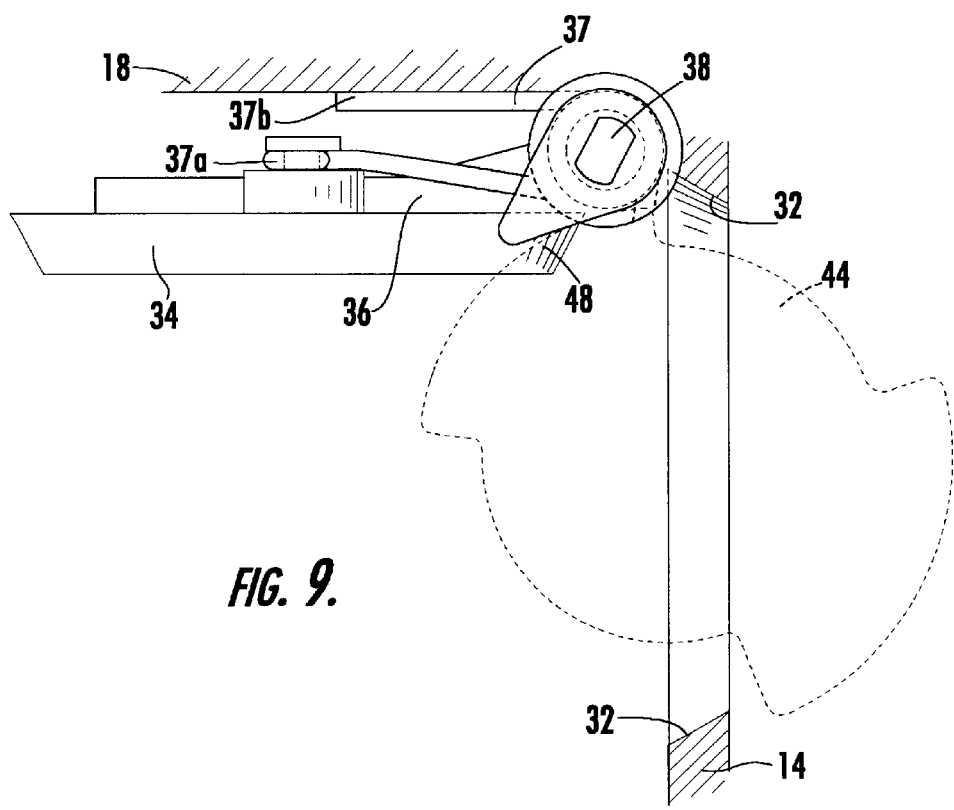
FIG. 9 is a view similar to FIG. 8 but with the swing valve in the open position.

To facilitate positioning the coupling plates in proper alignment, guide pins 26 are provided projecting from the surface of each coupling plate 14, 16 and cooperating guide cavities 28 are correspondingly located in the opposing coupling plate. The coupling plates 14, 16 each have a centrally located circular opening, best seen in FIGS. 3 and 10, which forms a part of the axial flow passageway through the coupling members. The peripheral surface of the coupling plate which defines the circular opening forms a valve seat 32. The valve seat is beveled to form a flared surface, with its smallest dimension being located at the outer sealing surface of the coupling plate, and with the diameter increasing in the axial direction. The valve seat 32 is configured to receive a circular swing valve 34 having a peripheral surface which is correspondingly flared. When the swing valve 34 is seated in the valve seat 32, its outer peripheral surface is flush with the outer sealing surface of the coupling plate and it is prevented from further outward movement. Each swing valve 34 is mounted for pivoting movement within its respective coupling housing (18, 20) by a swing valve arm 36. The swing valve 34 is held in the closed or sealed position by a torsional spring 37 mounted on the swing valve pivot shaft 38. As best seen in FIGS. 8 and 9, each torsional spring has one end 37*a* which bears against the rear of the swing valve arm 36 and its opposite end 37*b* bears against the interior surface of the coupling housing (18 or 20). The medial portion of this torsional spring 37 is coiled and is mounted surrounding the swing valve pivot shaft 38. Thus, as best seen in FIG. 8, spring 37 biases the swing valve to the closed position seated in the valve seat 32, as shown in FIG. 8. However, the swing valve can be pivotally moved to an open position, shown in FIG. 9, by an actuator mechanism to be presently described.

Figure 4:
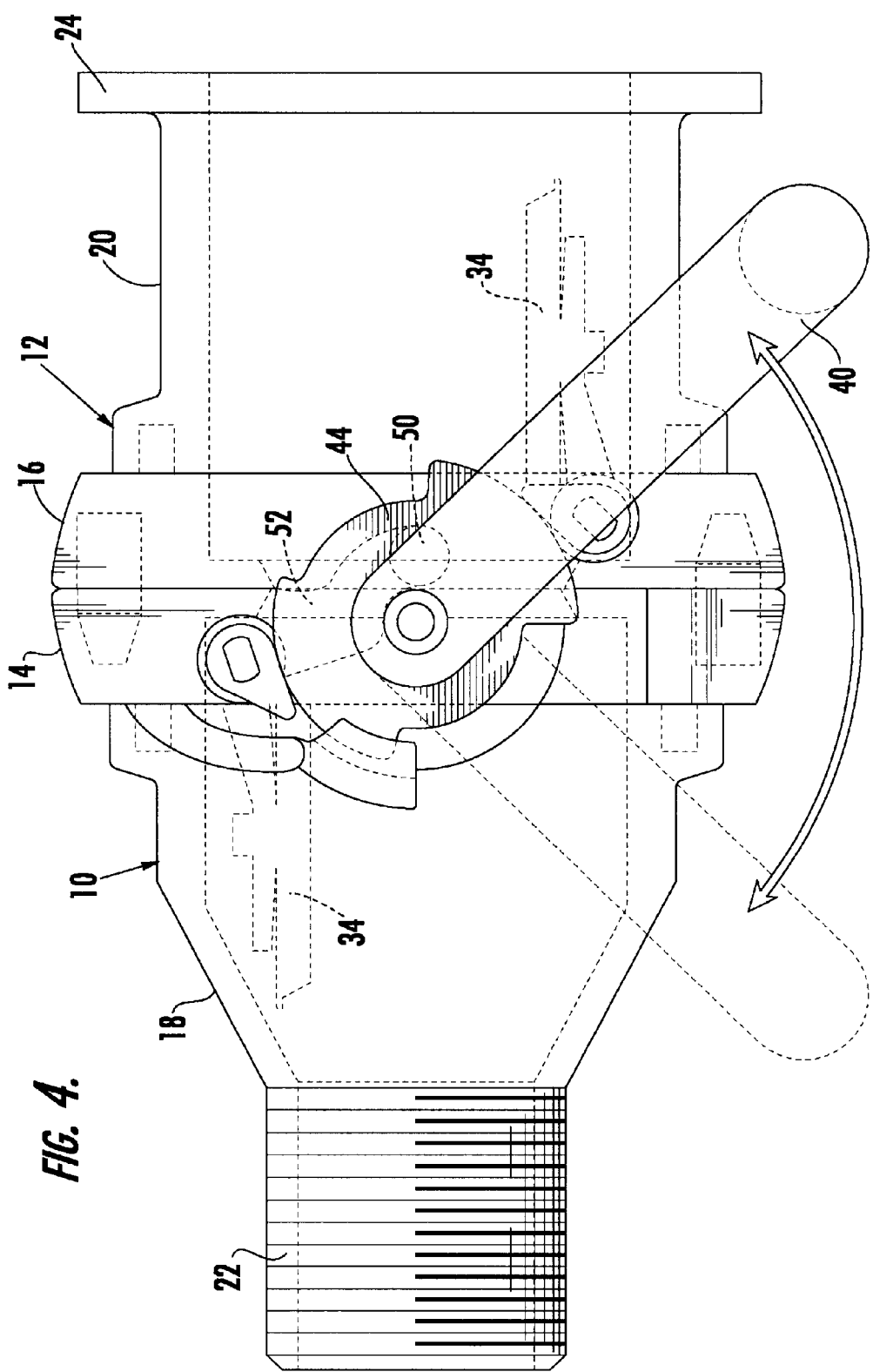
FIG. 4 is a side elevational view similar to FIG. 1, but showing the coupling members in the coupled state.

The actuator mechanism resides primarily on the coupling member 10 shown on the left in FIG. 1. In the embodiment illustrated, the actuator mechanism includes a handle 40 mounted for pivoting movement about a mounting lug 42 extending from the side of the coupling plate 14. Handle 40, in turn, is connected to an actuator cam 44, such that the handle 40 and cam 44 pivotally move as a unit about the axis of mounting lug 42. The swing valve pivot shaft 38 is mounted for pivotal movement within the coupling member 10 and is supported at opposite ends by bores 46 formed in the wall of the mounting plate 14 (see FIG. 3). One end of the shaft 38 projects from one side of the coupling plate 14 and is connected to a cam follower 48. As seen in FIG. 1, the actuator cam 44 has a lobe 44*a* positioned to engage the cam follower 48 when the handle 40 is moved from the released position shown in FIG. 1 to the locked position shown in FIG. 4. As a result, the cam shaft 38 is rotated, moving the swing valve from the seated position depicted in FIGS. 1 and 8 to the open position depicted in FIGS. 4 and 9. In this open position, the swing valve 34 is parallel to the axis of the flow passageway and is positioned adjacent the interior wall of coupling housing 18 and well out of flow obstructing relation.

The same mechanism which opens the swing valve in coupling member 10 also functions to open the swing valve in the cooperating coupling member 12. A cam shaft 38' and cam follower 48' are similarly mounted to the coupling plate 16 and are arranged for pivotally moving the swing valve from the closed position to the open position. A lobe 44*b* on the actuator cam 44 engages the cam follower 48' so as to override the bias of spring 37 and to move the swing valve to the open position shown in dotted lines in FIG. 4. Thus, by simply moving the handle 40 through an angle of approximately 90 degrees, both swing valves are simultaneously moved from the closed to the open position.

Figure 5:
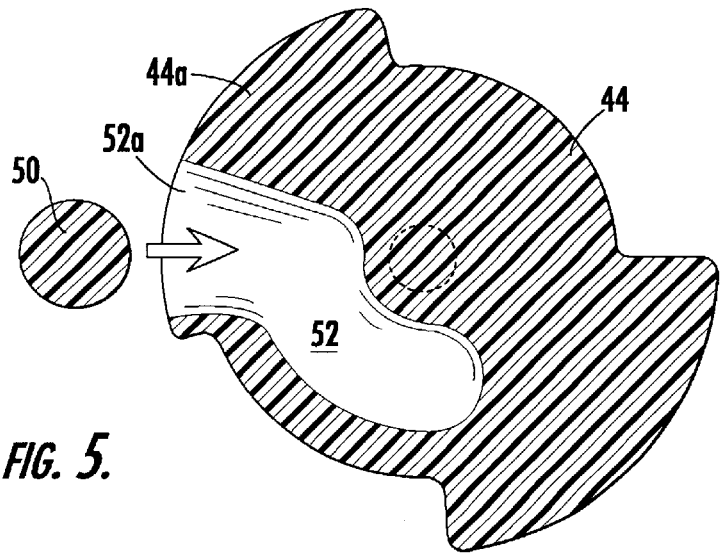
FIGS. 5, 6 and 7 are cross-sectional fragmentary detail views showing the operation of the cam which forms part of a locking mechanism for locking the coupling members together, with FIGS. 5 and 6 showing the position of the cam when the locking mechanism is in the released position, and with FIG. 7 showing the cam position when the locking mechanism is moved to the locked position.
Figure 6:
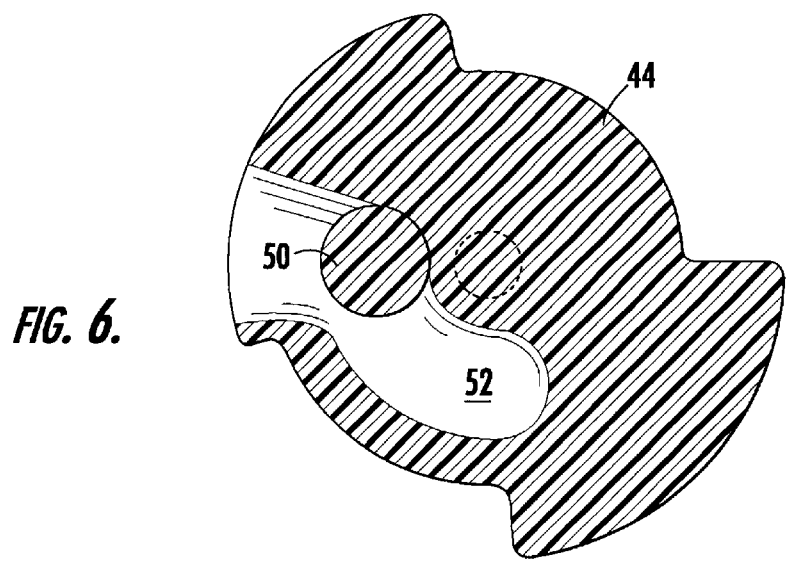
Figure 7:
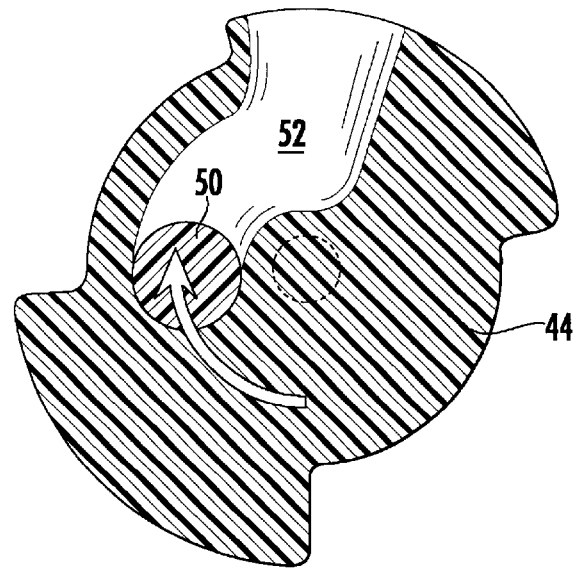

The actuator cam 44 additionally includes a locking surface which is configured to cooperate with a corresponding locking member 50 provided on the opposite coupling member 12. The locking surface of cam 44 cooperates with the locking member 50 to draw the coupling members 10, 12 together into a coupled and locked state when the handle 40 is moved from the released position shown in FIG. 1 to the locked position shown in solid lines in FIG. 4. More specifically, the locking surface of cam 44 is defined by an internal channel 52 whose interior locking surface has a gradually decreasing radius. As shown in FIG. 5, when the handle is in the released position, the opening 52*a* of the channel 52 is positioned for receiving the locking member 50 and allows for the locking member to be inserted into the channel 52, as shown in FIG. 6, as the two coupling members are brought together into alignment for assembly. When the handle 40 is moved to the locked position, the locking member is drawn closer to the rotational axis of the actuator cam 44. To achieve this function, the interior locking surface may be contoured with a constantly decreasing radius. Alternatively, the locking surface may have a constant radius about a point which is slightly offset from the center of rotation of the locking cam.

It will thus be seen that the actuator mechanism of the present invention performs several functions. Once the two coupling members 10, 12 are positioned opposite one another, the guide pins position the two coupling plates 14, 16 in alignment. As the handle 40 is moved through an arc of approximately 90 degrees from the released position to the locked position, the two coupling members 10, 12 are locked together and the swing valves are opened. More specifically, during the initial stages of rotation of the actuator cam 44, the two coupling members 10, 12 are drawn tightly together into sealing engagement. Then, after a fluid seal has been effected, further rotation of the actuator cam 44 causes the swing valves to be simultaneously opened to allow for fluid communication through the coupling. Rotation of the actuator cam in the opposite direction causes the swing valves to be closed, after which the two coupling members 10, 12 are released from one another.

In the illustrated embodiment, the actuator mechanism is manually operable and includes a handle 40. However, it should be understood that the actuator mechanism can be embodied in other forms, and can be operated either manually or with the use of automated components such as electromechanical, hydraulic or pneumatic operators. Furthermore, the two coupling members can have a different configuration or appearance from that illustrated, and can be configured differently from one another. For example, for certain environments, one of the coupling members could be configured for being hard mounted to a surface, with the other coupling being configured to connect to a flexible conduit.

Figure 10:
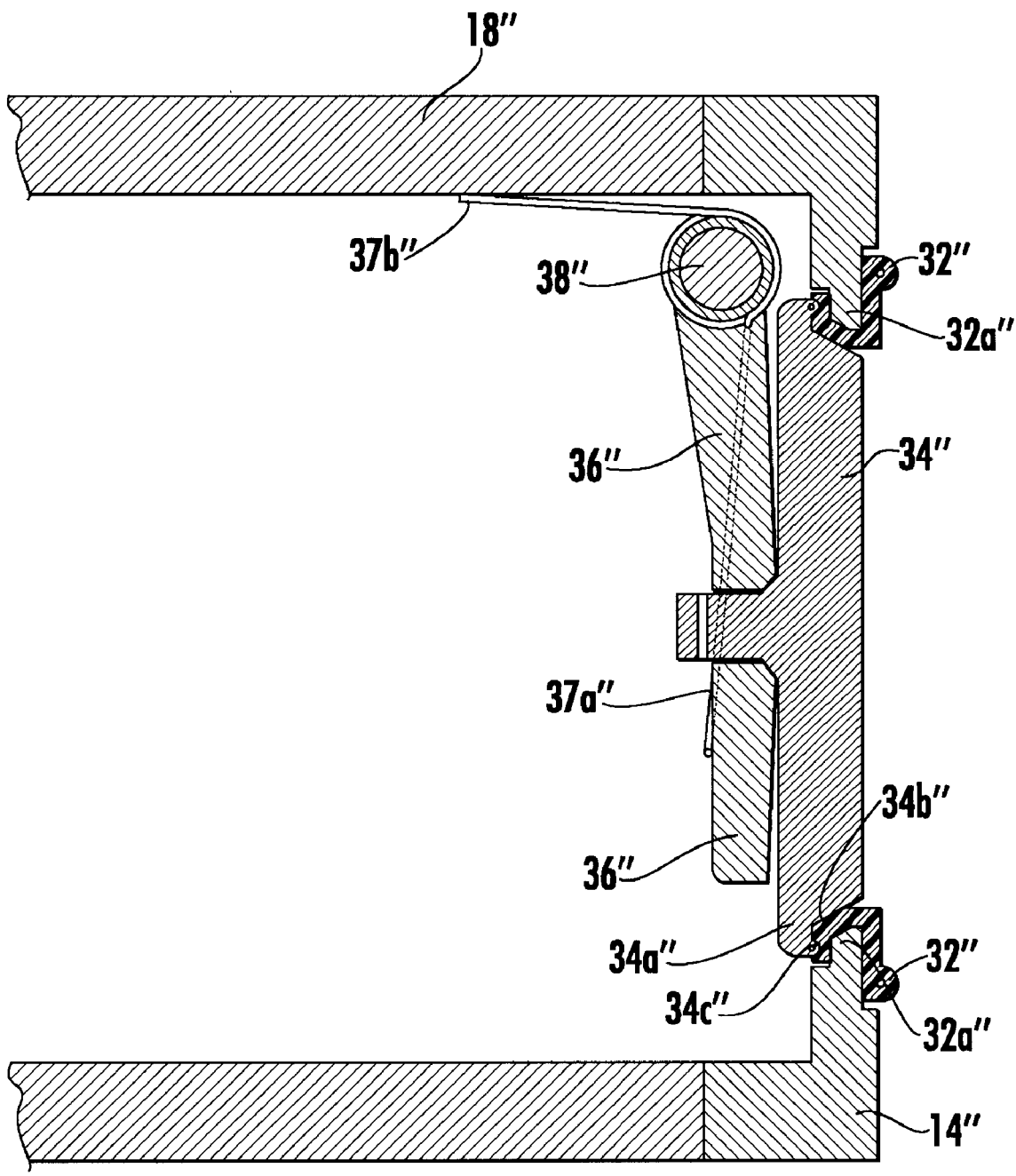
FIG. 10 is a cross-sectional view showing another embodiment of the swing valve and swing valve seal configuration.
Figure 11:
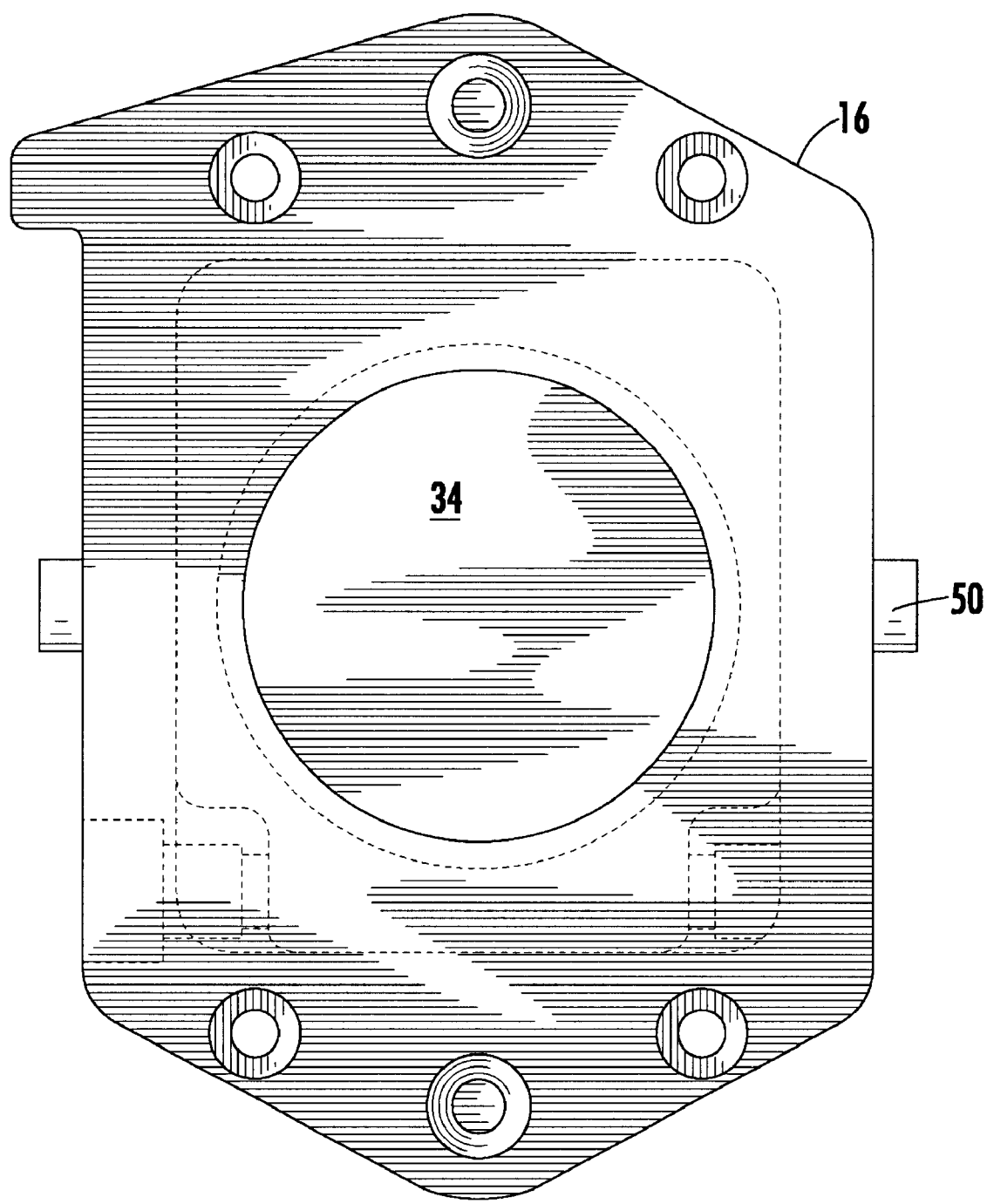
FIG. 11 is an end elevational view of a coupling member with the swing valve in the closed position.

FIG. 10 illustrates an alternative embodiment for the swing valve and its cooperating valve seat. To avoid repetition, elements which correspond to those previously described will be identified with the same reference characters, with double prime notation (") added. In this embodiment, the valve seat is defined by a flexible resilient seal 32". The seal is of generally U-shaped cross-section having an internal channel which cooperates with a correspondingly shaped flange 32*a"* formed along the circular flow passageway opening in the coupling plate 14" and allows the seal to be mounted to the flange 32*a"*. The U-shaped seal provides two sealing surfaces for cooperating with the swing valve 34": one surface facing axially and a second sealing surface facing generally radially inwardly. The inwardly facing sealing surface is arranged to seal with a flared peripheral surface 34*b"* of the swing valve 34". The axially facing surface is adapted to seal with a peripheral flange 34*a"* formed on the swing valve 34" The flange 34*a"* may also be provided with a projecting sealing lip 34*c"* which bears against the axially facing sealing surface.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A self-sealing quick disconnect coupling comprising:
   a pair of cooperating coupling members, each having an axial bore defining a flow passageway, the coupling members being movable between a disconnected state and a coupled state with the flow passageways connected in fluid communication;
   a swing valve pivotally mounted within each coupling member and movable between an open position out of flow-obstructing relation with the flow passageway and a closed, sealed position blocking the flow passageway; and
   an actuator mechanism cooperating with said swing valves and operable for moving the swing valves from the closed position when the coupling members are in the disconnected state to the open position when the coupling members are in the coupled state.

2. The coupling of claim 1, wherein the actuator mechanism is movable between a released position and a locked position, and the actuator mechanism is operable for holding the coupling members in the coupled state when the actuator mechanism is moved to the locked position.

3. The coupling of claim 2, wherein the actuator mechanism includes a handle which is movable between said released and locked positions, a cam connected to and movable by said handle, said cam having an actuator surface, and a cam follower connected to each said swing valve, the cam follower cooperating with said cam actuator surface for moving the swing valve from said closed position to said open position.

4. The coupling of claim 3, including a spring cooperating with each swing valve for biasing the swing valve to the closed position, and wherein the cam follower is arranged to override the bias of said spring in moving the swing valve to the open position.

5. The coupling of claim 3, wherein said handle and said cam are mounted to one of said coupling members, and said cam additionally includes a locking surface, and including a locking member carried by the other one of said coupling members positioned to cooperate with said cam locking surface for locking the pair of coupling members together when the handle is moved to the locked position.

6. The coupling of claim 5, wherein said cam locking surface is defined by a channel formed in said cam and configured to receive said locking member when the handle is in the released position and to draw the coupling members together into cooperating coupled relation when the handle is moved to the locked position.

7. The coupling of claim 6, wherein said cam actuator surface is defined by a peripheral surface of the cam.

8. The coupling of claim 1, wherein said coupling members each include a coupling plate defining a substantially planar coupling surface, the coupling surfaces being positioned in opposing contacting relation when the coupling members are in the coupled state, guide pins projecting from said coupling surface, and cooperating guide cavities formed in said coupling surface positioned for receiving the guide pin of the opposing coupling surface.

9. The coupling of claim 8, wherein the axial bore of the coupling member defines a circular opening in the coupling plate and a beveled valve seat adjoining the circular opening, and said swing valve has a correspondingly beveled circular peripheral surface for seating against the valve seat.

10. The coupling of claim 8, wherein the axial bore of the coupling member defines a circular opening in the coupling plate, and a resilient flexible seal is mounted in the circular opening defining a valve seat, and said swing valve has a peripheral surface configured for seating against the resilient flexible seal.

11. A self-sealing quick disconnect coupling comprising:
    a pair of cooperating coupling members, each having an axial bore defining a flow passageway, the coupling members being movable between a disconnected state and a coupled state with the flow passageways connected in fluid communication;
    a swing valve pivotally mounted within each coupling member and movable between an open position out of flow-obstructing relation with the flow passageway and a closed, sealed position blocking the flow passageway; and
    an actuator mechanism including a handle which is movable between a released position and a locked position, a cam connected to and movable by said handle, said cam having an actuator surface, and a cam follower connected to each said swing valve, the cam follower cooperating with said cam actuator surface for moving the swing valve from the closed position when the coupling members are in the disconnected state to the open position when the coupling members are in the coupled state.

12. The coupling of claim 11, including a spring cooperating with each swing valve for biasing the swing valve to the closed position, and wherein the cam follower is arranged to override the bias of said spring in moving the swing valve to the open position.

13. The coupling of claim 11, wherein the handle is carried by one of the coupling members and is movable between a released position and a locked position, and the cam additionally includes a locking surface, and including a locking member carried by the other one of said coupling members positioned to cooperate with said cam locking surface for locking the pair of coupling members together when the handle is moved to the locked position.

14. The coupling of claim 13, wherein said cam locking surface is defined by a channel formed in said cam and configured to receive said locking member when the handle is in the released position and to draw the coupling members together into cooperating coupled relation when the handle is moved to the locked position.

15. The coupling of claim 14, wherein said cam actuator surface is defined by a peripheral surface of the cam.

16. A self-sealing quick disconnect coupling comprising:
    a pair of cooperating coupling members, each having an axial bore defining a flow passageway, and each including a coupling plate defining a substantially planar coupling surface, the coupling members being movable between a disconnected state and a coupled state with said coupling surfaces positioned in opposing contacting relation and with the flow passageways connected in fluid communication;
    a swing valve pivotally mounted within each coupling member and movable between an open position out of flow-obstructing relation with the flow passageway and a closed, sealed position seated in said coupling plate to block the flow passageway;

a spring cooperating with each swing valve for biasing the swing valve to the closed position; and an actuator mechanism cooperating with said swing valves and operable for moving the swing valves from the closed position when the coupling members are in the disconnected state to the open position when the coupling members are in the coupled state.

17. The coupling of claim 16, wherein said actuator mechanism includes a handle which is movable between a released position and a locked position, a cam connected to and movable by said handle, said cam having an actuator surface, and a cam follower connected to each said swing valve, the cam follower cooperating with said cam actuator surface for moving the swing valve from the closed position when the coupling members are in the disconnected state to the open position when the coupling members are in the coupled state.

18. The coupling of claim 16, including guide pins projecting from said coupling surface, and cooperating guide cavities formed in said coupling surface positioned for receiving the guide pin of the opposing coupling surface.

19. The coupling of claim 16, wherein the axial bore of the coupling member defines a circular opening in the coupling plate and a beveled valve seat adjoining the circular opening, and said swing valve has a correspondingly beveled circular peripheral surface for seating against the valve seat.

20. The coupling of claim 19, wherein the beveled valve seat and the correspondingly beveled circular peripheral surface of the valve seat are so configured and oriented as to position and retain the swing valve substantially flush with said coupling surface when the swing valve is seated in the valve seat.

* * * * *